(12) United States Patent
Frazier

(10) Patent No.: US 10,161,622 B1
(45) Date of Patent: Dec. 25, 2018

(54) ILLUMINATING THREE-PANEL ANTI-FOG MIRROR

(71) Applicant: Hephzibah Frazier, Allston, MA (US)

(72) Inventor: Hephzibah Frazier, Allston, MA (US)

( * ) Notice: Subject to any disclaimer, the term of this patent is extended or adjusted under 35 U.S.C. 154(b) by 64 days.

(21) Appl. No.: 15/376,795

(22) Filed: Dec. 13, 2016

(51) Int. Cl.
| | |
|---|---|
| *F21V 33/00* | (2006.01) |
| *G02B 27/00* | (2006.01) |
| *F21V 23/04* | (2006.01) |
| *G02B 5/08* | (2006.01) |
| *A45D 42/18* | (2006.01) |
| *A47G 1/04* | (2006.01) |

(52) U.S. Cl.
CPC ............ *F21V 33/004* (2013.01); *A45D 42/18* (2013.01); *A47G 1/04* (2013.01); *F21V 23/04* (2013.01); *G02B 5/08* (2013.01); *G02B 27/0006* (2013.01)

(58) Field of Classification Search
CPC ......... F21V 23/04; F21V 33/004; A47G 1/04; A45D 42/18; G02B 5/08; G02B 27/0006
See application file for complete search history.

(56) References Cited

U.S. PATENT DOCUMENTS

| | | | | |
|---|---|---|---|---|
| 1,381,874 | A | | 6/1921 | Harper |
| 1,405,532 | A | * | 2/1922 | Marko ................... A45D 33/32 |
| | | | | 132/288 |
| 3,160,736 | A | * | 12/1964 | Catterson ................. A47G 1/02 |
| | | | | 219/218 |
| 3,794,828 | A | * | 2/1974 | Arpino ................... A45C 5/005 |
| | | | | 307/38 |
| 4,487,479 | A | | 12/1984 | Tolomeo, Sr. |
| 4,643,544 | A | | 2/1987 | Loughran |
| 5,623,955 | A | | 4/1997 | Sewell |
| D391,773 | S | | 3/1998 | Zaidman |
| 5,940,350 | A | * | 8/1999 | Booty, Jr. .......... G04B 37/1413 |
| | | | | 248/206.2 |
| 8,786,704 | B2 | * | 7/2014 | Foote ................... B60Q 1/2665 |
| | | | | 348/148 |
| 2004/0156133 | A1 | | 8/2004 | Vernon |
| 2012/0081620 | A1 | | 4/2012 | Mischel, Jr. |

FOREIGN PATENT DOCUMENTS

| | | | |
|---|---|---|---|
| CN | 202908343 U | | 5/2013 |
| JP | 09262166 A | * | 10/1997 |

* cited by examiner

*Primary Examiner* — Bao Q Truong
*Assistant Examiner* — Arman B Fallahkhair
(74) *Attorney, Agent, or Firm* — Kyle A. Fletcher, Esq.

(57) ABSTRACT

The three-paneled mirror is a multi-paneled mirror set that is adapted to be used in and around a bathroom or other locale where a mirror may be required. The three-paneled mirror includes an anti-fogging capability so as to prevent condensation from occurring on any of a plurality of mirrored surfaces. The three-paneled mirror further includes a plurality of suction cups as well as hooks to provide support of the three-paneled mirror on different surfaces. Each of the plurality of mirrored surfaces is interconnected with one another via a hinge such that the entire assembly is able to fold itself into a closed state when not in use. The three-paneled mirror includes a plurality of lights that illuminate an end user when positioned in front of the plurality of mirrored surfaces.

10 Claims, 4 Drawing Sheets

ILLUMINATING THREE-PANEL ANTI-FOG MIRROR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of bathroom mirrors, more specifically, a three-paneled mirror that includes an anti-fogging capability along with other features, and which is able to support itself with respect to a walled surface.

SUMMARY OF INVENTION

The three-paneled mirror is a multi-paneled mirror set that is adapted to be used in and around a bathroom or other locale where a mirror may be required. The three-paneled mirror includes an anti-fogging capability so as to prevent condensation from occurring on any of a plurality of mirrored surfaces. The three-paneled mirror further includes a plurality of suction cups as well as hooks to provide support of the three-paneled mirror on different surfaces. Each of the plurality of mirrored surfaces is interconnected with one another via a hinge such that the entire assembly is able to fold itself into a closed state when not in use. The three-paneled mirror includes a plurality of lights that illuminate an end user when positioned in front of the plurality of mirrored surfaces. The three-paneled mirror is further defined with a timer mechanism that is able to display an amount of time on one of the plurality of mirrored surfaces so as to provide a time feedback to the end user. Control buttons are provided on one of the surfaces of the three-paneled mirror in order to control use of the anti-fogging capability, the plurality of lights, and the timer mechanism.

These together with additional objects, features and advantages of the three-paneled mirror will be readily apparent to those of ordinary skill in the art upon reading the following detailed description of the presently preferred, but nonetheless illustrative, embodiments when taken in conjunction with the accompanying drawings.

In this respect, before explaining the current embodiments of the three-paneled mirror in detail, it is to be understood that the three-paneled mirror is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the three-paneled mirror.

It is therefore important that the claims be regarded as including such equivalent construction insofar as they do not depart from the spirit and scope of the three-paneled mirror. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
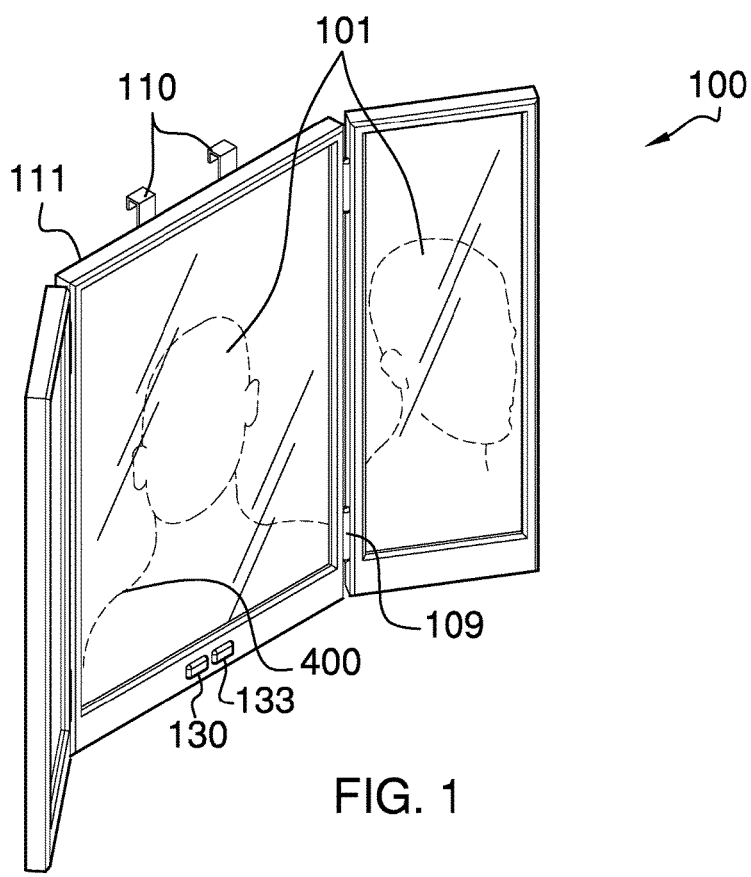
FIG. 1 is a perspective view of an embodiment of the disclosure.
Figure 2:
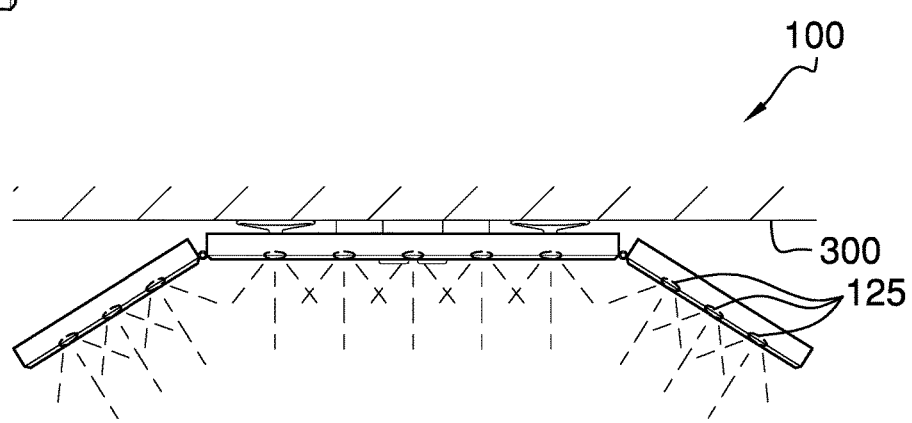
FIG. 2 is a top view of an embodiment of the disclosure.
Figure 3:
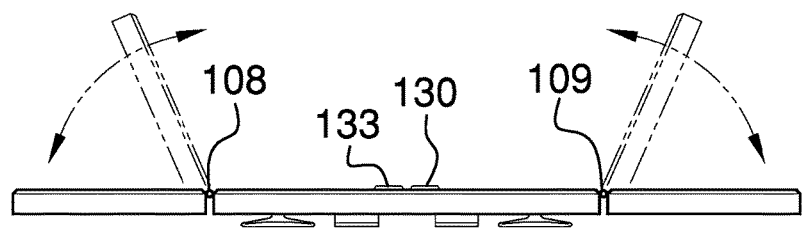
FIG. 3 is another top view of an embodiment of the disclosure.
Figure 4:
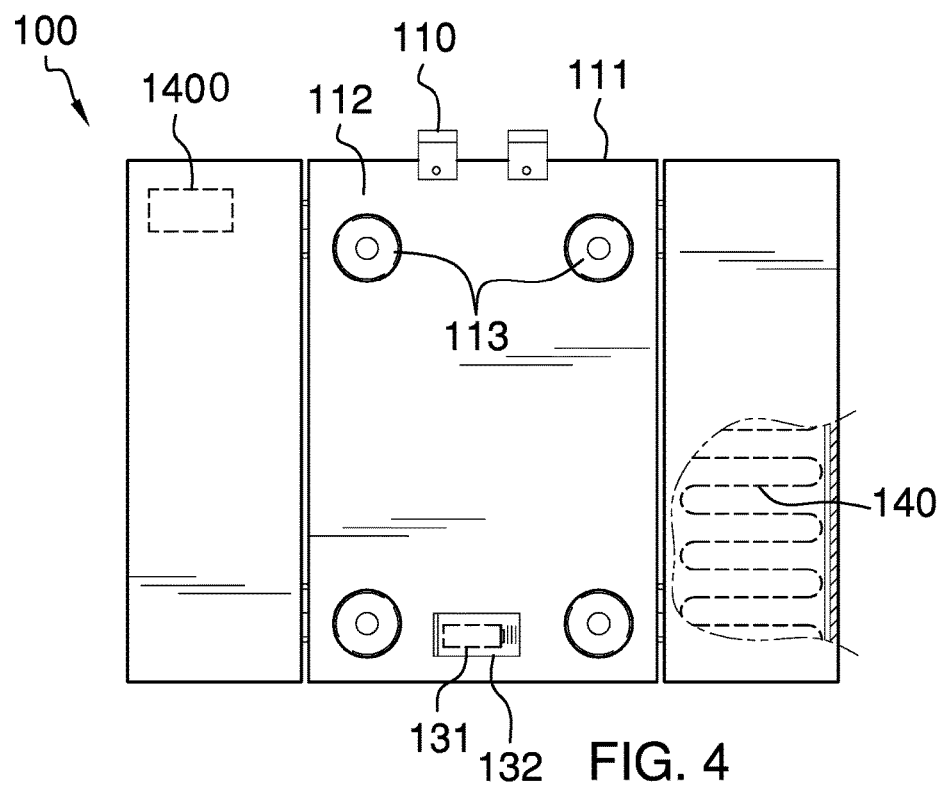
FIG. 4 is a rear view of an embodiment of the disclosure.
Figure 5:
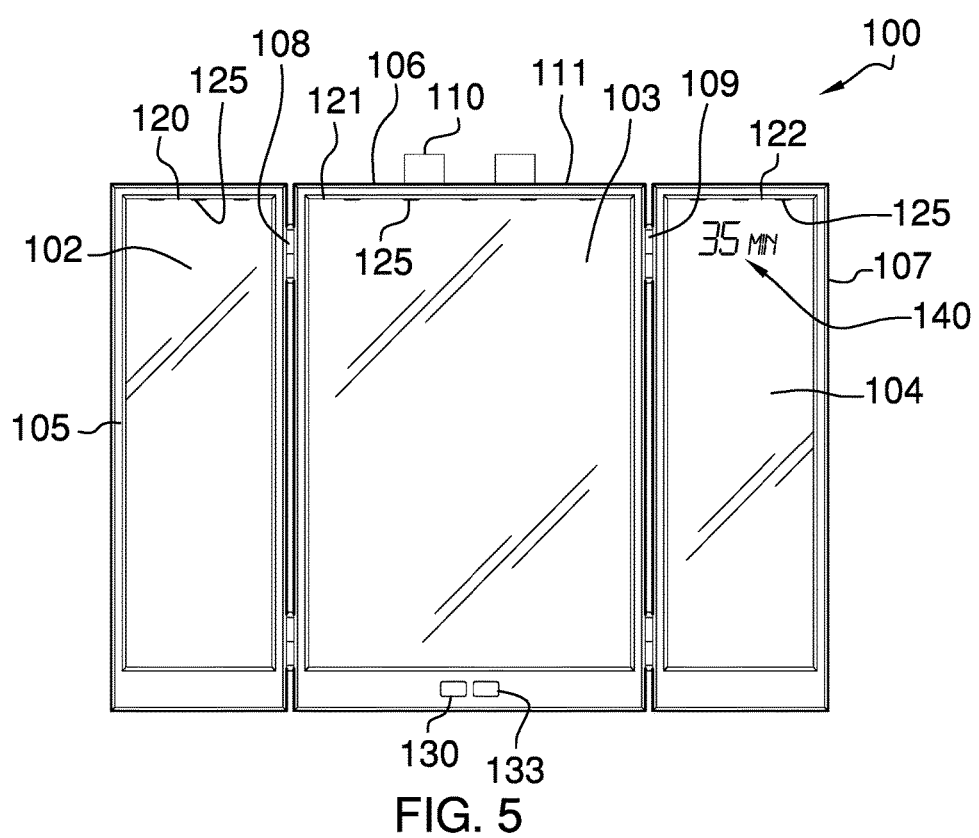
FIG. 5 is a front view of an embodiment of the disclosure.
Figure 6:
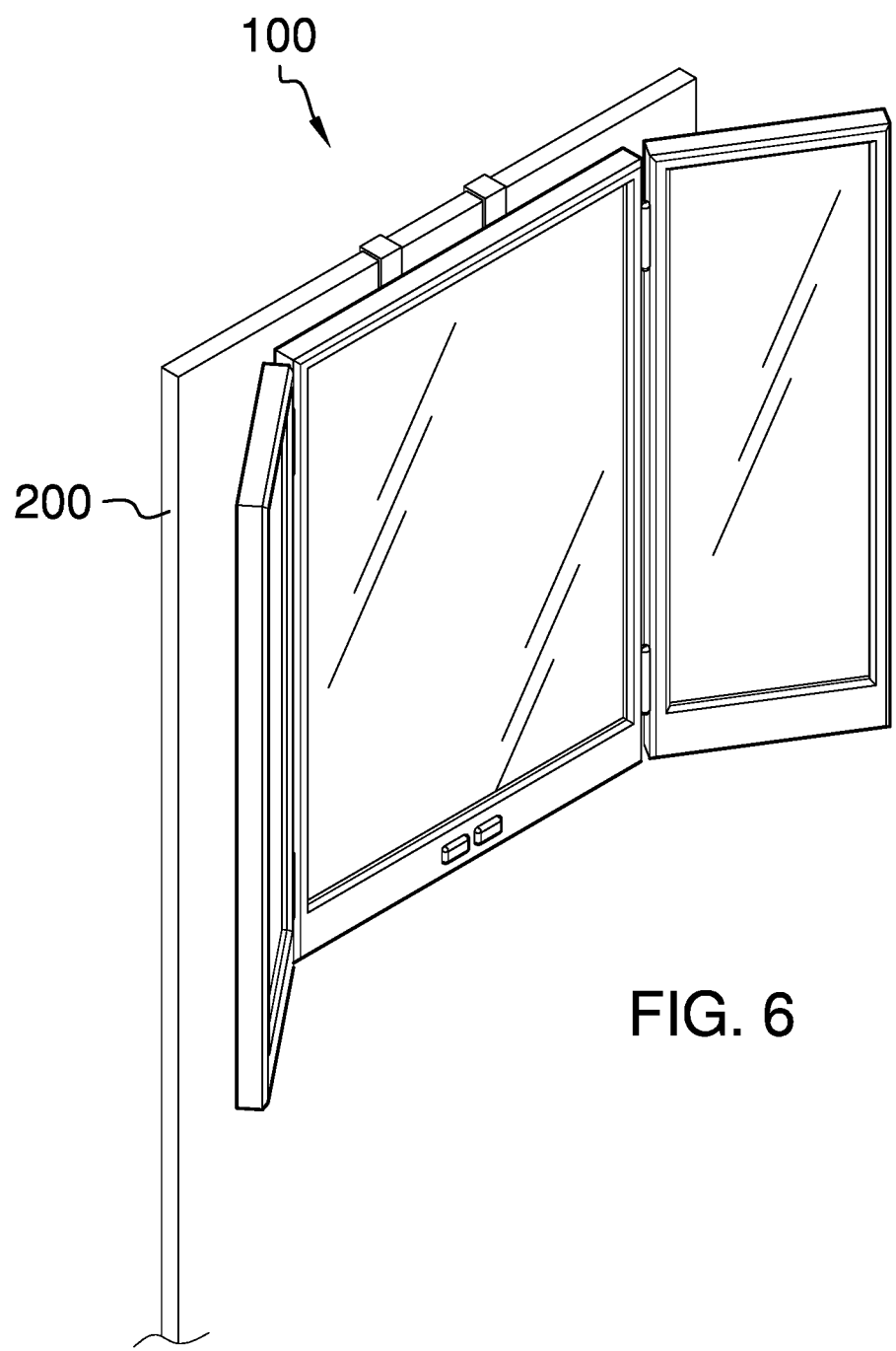
FIG. 6 is another perspective view of an embodiment of the disclosure.

Detailed reference will now be made to one or more potential embodiments of the disclosure, which are illustrated in FIGS. 1 through 6.

The three-paneled mirror 100 (hereinafter invention) comprises a plurality of mirrored surfaces 101. The plurality of mirrored surfaces 101 shall be further defined as a first mirrored surface 102, a second mirrored surface 103, and a third mirrored surface 104. The first mirrored surface 102 is mounted to and supported within a first mirror frame 105. The second mirrored surface 103 is mounted to and supported within a second mirror frame 106. The third mirrored surface 104 is mounted to and supported within a third mirror frame 107.

The first mirror frame 105 is pivotably attached to the second mirror frame 106 via at least one primary hinge 108. The third mirror frame 107 is pivotably attached to the second mirror frame 106 via at least one secondary hinge 109. The second mirror frame 106 is positioned between the first mirror frame 105 and the third mirror frame 107. Moreover, the at least one primary hinge 108 and the at least one secondary hinge 109 enables the first mirror frame 105 and the third mirror frame 107 to rotate with respect to the second mirror frame 106. It is envisioned that the at least one primary hinge 108 and the at least one secondary hinge 109 enable the first mirror frame 105 and the third mirror frame 107 to rotate around and close off the second mirrored surface 103 positioned within the second mirror frame 106.

The second mirror frame 106 includes at least one hook 110 along a top edge 111 of the second mirror frame 106. The at least one hook 110 is adapted to support the invention 100 on a door 200 or other object. The second mirror frame 106 is further defined with a rear surface 112 onto which a plurality of suction cups 113 are provided. The plurality of suction cups 113 are adapted to secure the invention 100 against a secondary surface 300. It shall be noted that the secondary surface 300 is ideally glass or a smooth surface that is adapted to form a vacuum via the plurality of suction cups 113. It shall be noted that a plurality of magnets may be substituted for the plurality of suction cups 113. The use of and interchanging of magnets and suction cups are well known in the art. The plurality of magnets would be used to secure the invention 100 against a ferrous surface or a surface with a magnetized field.

The first mirror frame 105 is further defined with a first edge 120. The first edge 120 is provide atop of the first mirrored surface 102. The second mirror frame 106 is further defined with a second edge 121. The second edge 121 is provide atop of the second mirrored surface 103. The third mirror frame 107 is further defined with a third edge 122. The third edge 122 is provide atop of the third mirrored surface 104. The first edge 120, the second edge 121, and the third edge 122 are each adorned with a plurality of lights 125. The plurality of lights 125 are pointed outwardly so as to illuminate an end user 400.

The plurality of lights 125 are collectively wired to a first on/off button 130. The first on/off button 130 is also wired to a powering member 131. The powering member 131 is ideally at least one battery, which is housed within a powering member compartment 132. The powering member compartment 132 is provided on the rear surface 112 of the second mirror frame 106.

The invention 100 includes a heating element 140 in order to prevent fogging up of the plurality of mirrored surfaces 101. Moreover, the heating element 140 traverses between the first mirrored surface 102 and the first mirror frame 105. The heating element 140 also traverses between the second mirrored surface 103 and the second mirror frame 106. The heating element 140 also traverses between the third mirrored surface 104 and the third mirror frame 107.

The heating element 140 is wired to a second on/off button 133. The second on/off button 133 is adjacent to the first on/off button 130. Moreover, the second on/off button 133 is wired to the powering member 131. The powering member 131 supplies electricity to the heating element 140 in order to generate heat that is transferred to the plurality of mirrored surfaces 101 thereby preventing condensation from accruing thereon.

The invention 100 may optionally include a timer mechanism 1400. The timer mechanism 1400 is built into the construction of the third mirrored surface 104. The timer mechanism 1400 may be wired to the first on/off button 130 in order to operate in concert with the plurality of lights 125. It is envisioned that the timer mechanism 1400 either displays time or counts a pre-determined amount of time down before the invention 100 turns itself off.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A three-paneled mirror comprising:
a plurality of mirrored surfaces that include a defogging member, a plurality of lights, and a timer mechanism;
wherein the plurality of mirrored surfaces is further defined as a first mirrored surface, a second mirrored surface, and a third mirrored surface;
wherein the first mirrored surface is mounted to and supported within a first mirror frame;
wherein the second mirrored surface is mounted to and supported within a second mirror frame;
wherein the third mirrored surface is mounted to and supported within a third mirror frame; wherein the defogging member includes a heating element that traverses between the plurality of the mirrored surfaces and their associated mirror frames; wherein the plurality of lights are provided on top edges of the plurality of the mirrored surfaces;
wherein the first mirror frame is pivotably attached to the second mirror frame via at least one primary hinge;
wherein the third mirror frame is pivotably attached to the second mirror frame via at least one secondary hinge;
wherein the second mirror frame is positioned between the first mirror frame and the third mirror frame;
wherein the at least one primary hinge and the at least one secondary hinge enables the first mirror frame and the third mirror frame to rotate with respect to the second mirror frame;
wherein the at least one primary hinge and the at least one secondary hinge enable the first mirror frame and the third mirror frame to rotate around and close off the second mirrored surface positioned within the second mirror frame;
wherein the second mirror frame includes at least one hook along a top edge of the second mirror frame;
wherein the at least one hook is adapted to support the three-paneled mirror on a door;
wherein the second mirror frame is further defined with a rear surface onto which a plurality of suction cups are provided;
wherein the plurality of suction cups are adapted to secure the three-paneled mirror against the door.

2. The three-paneled mirror according to claim 1 wherein the first mirror frame is further defined with a first edge; wherein the first edge is provide atop of the first mirrored surface; wherein the second mirror frame is further defined with a second edge; wherein the second edge is provide atop of the second mirrored surface; wherein the third mirror frame is further defined with a third edge; wherein the third edge is provide atop of the third mirrored surface.

3. The three-paneled mirror according to claim 2 wherein the first edge, the second edge, and the third edge are each adorned with the plurality of lights; wherein the plurality of lights are pointed outwardly so as to illuminate an end user.

4. The three-paneled mirror according to claim 3 wherein the plurality of lights are collectively wired to a first on/off button.

5. The three-paneled mirror according to claim 4 wherein the first on/off button is also wired to a powering member; wherein the powering member is housed within a powering member compartment; wherein the powering member compartment is provided on the rear surface of the second mirror frame.

6. The three-paneled mirror according to claim 5 wherein the defogging member is further defined with a heating element that prevents condensation from condensing upon the plurality of mirrored surfaces.

7. The three-paneled mirror according to claim 6 wherein the heating element traverses between the first mirrored surface and the first mirror frame; wherein the heating element traverses between the second mirrored surface and the second mirror frame; wherein the heating element traverses between the third mirrored surface and the third mirror frame.

8. The three-paneled mirror according to claim 7 wherein the heating element is wired to a second on/off button; wherein the second on/off button is adjacent to the first on/off button; wherein the second on/off button is wired to the powering member; wherein the powering member supplies electricity to the heating element in order to generate heat that is transferred to the plurality of mirrored surfaces thereby preventing condensation from accruing thereon.

9. The three-paneled mirror according to claim 8 wherein the timer mechanism is built into the construction of the third mirrored surface.

10. The three-paneled mirror according to claim 9 wherein the timer mechanism is wired to the first on/off button in order to operate in concert with the plurality of lights.

* * * * *